United States Patent [19]
Watters et al.

[11] Patent Number: 6,070,083
[45] Date of Patent: May 30, 2000

[54] MOBILE COMMUNICATION DEVICE AND COMMUNICATION NETWORK FOR PROVIDING LOCATION SERVICES

[75] Inventors: J. Michael Watters, Kanata; Leo Strawczynski, Ottawa; David Steer, Nepean, all of Canada

[73] Assignee: Nortel Networks Corporation, Montreal, Canada

[21] Appl. No.: 09/078,499

[22] Filed: May 14, 1998

[51] Int. Cl.[7] ..................................................... H04Q 7/20
[52] U.S. Cl. .......................... 455/517; 455/456; 455/440; 455/524; 455/67.1
[58] Field of Search .................................... 455/456, 457, 455/440, 524, 67.1, 226.1; 342/463, 464, 465, 457, 357.1, 357.08

[56] References Cited

U.S. PATENT DOCUMENTS

| | | | |
|---|---|---|---|
| 5,008,679 | 4/1991 | Effland et al. | 342/353 |
| 5,293,645 | 3/1994 | Sood . | |
| 5,512,908 | 4/1996 | Herrick | 342/387 |
| 5,570,099 | 10/1996 | DesJardins | 342/378 |
| 5,600,706 | 2/1997 | Dunn et al. | 379/59 |
| 5,646,632 | 7/1997 | Khan et al. . | |
| 5,758,288 | 5/1998 | Dunn et al. | 455/456 |

OTHER PUBLICATIONS

Kevin J. Krizman, Thomas E. Biedka, and Theodore S. Rappaport, Wireless Position Location: Fundamentals, Implementation Strategies, and Sources of Error, 1997.
Jeffrey H. Reed, Kevin J. Krizman, Brian d. Woener, and Theodore S. Rappaport, An Overview of of Challenges and Progress in Meeting the E–911 Requirement for Location Service, Apr. 1998.
James J. Caffery, Jr. and Gordon L. Stüber, Overview of Radiolocation in CDMA Cellular Systems, Apr. 1998.
Christopher Drane, Malcolm Macnaughtan, and Craig Scott, Positioning GSM Telephones, Apr. 1998.

*Primary Examiner*—Daniel S. Hunter
*Assistant Examiner*—Yamane Woldetatios
*Attorney, Agent, or Firm*—Foley & Lardner

[57] ABSTRACT

A mobile communication system and communication device for providing location services. Time difference of arrival (TDOA) measurements are used to determine the location of a mobile of the network. The location may be forwarded to a service provider. The location may alternatively be used to determine service providers that are local to the mobile. Correction factors deprived from calibration TDOA measurements made at calibration terminals are applied to the TDOA measurements enhance the accuracy of the location determination.

83 Claims, 6 Drawing Sheets

MOBILE COMMUNICATION DEVICE AND COMMUNICATION NETWORK FOR PROVIDING LOCATION SERVICES

FIELD OF THE INVENTION

The invention pertains to the field of mobile communications. The invention addresses the problem of providing services that are dependent upon determination of the location of a mobile unit of a communication network.

BACKGROUND OF THE INVENTION

Present mobile radio systems, such as CDMA cellular telephone systems, provide communication of voice and data signals from a mobile unit through a communication network. However, conventional systems provide only minimal location-dependent services for mobiles. Conventional systems also fail to provide location determination with sufficient accuracy for practical implementation of location services.

SUMMARY OF THE INVENTION

It is an object of the invention to provide a communication network that provides the location of a mobile to a service provider so that a services may be provided to the user of the mobile at the location of the mobile.

It is a further object of the invention to provide a communication network that provides information regarding available services to a user of a mobile based on a determination of the location of the mobile.

It is a further object of the invention to achieve the aforementioned objects in a manner that improves over the accuracy of conventional location determination devices and processes It is a further object of the invention to provide a mobile communication device and network, and associated processes and network elements, for achieving the above objects.

The aforementioned objects of the invention are accomplished, in general terms, by a communication network comprising a plurality of base station, provided at known locations and a mobile unit. The location of the mobile unit is determined through analysis of the time difference of arrival (TDOA) at the mobile of signals from at least three base station pairs. The accuracy of the location determination is enhanced through application of correction factors to the TDOA measurements. The location of the mobile may be provided to a service provider, or alternatively, the mobile may be provided with information regarding service providers that are local to the determined location of the mobile. In the latter case, the mobile may subsequently specify a service provider, and the location of the mobile may be provided to the specified service provider.

A variety of embodiments in accordance with the above general principles, including embodiments preferred for achieving particular objects, are disclosed in detail below.

DESCRIPTION OF THE DRAWINGS

The invention and its various preferred embodiments will be understood through reference to the following disclosure in conjunction with the accompanying drawings, in which.

DETAILED DESCRIPTION OF THE INVENTION AND PREFERRED EMBODIMENTS

Figure 1:
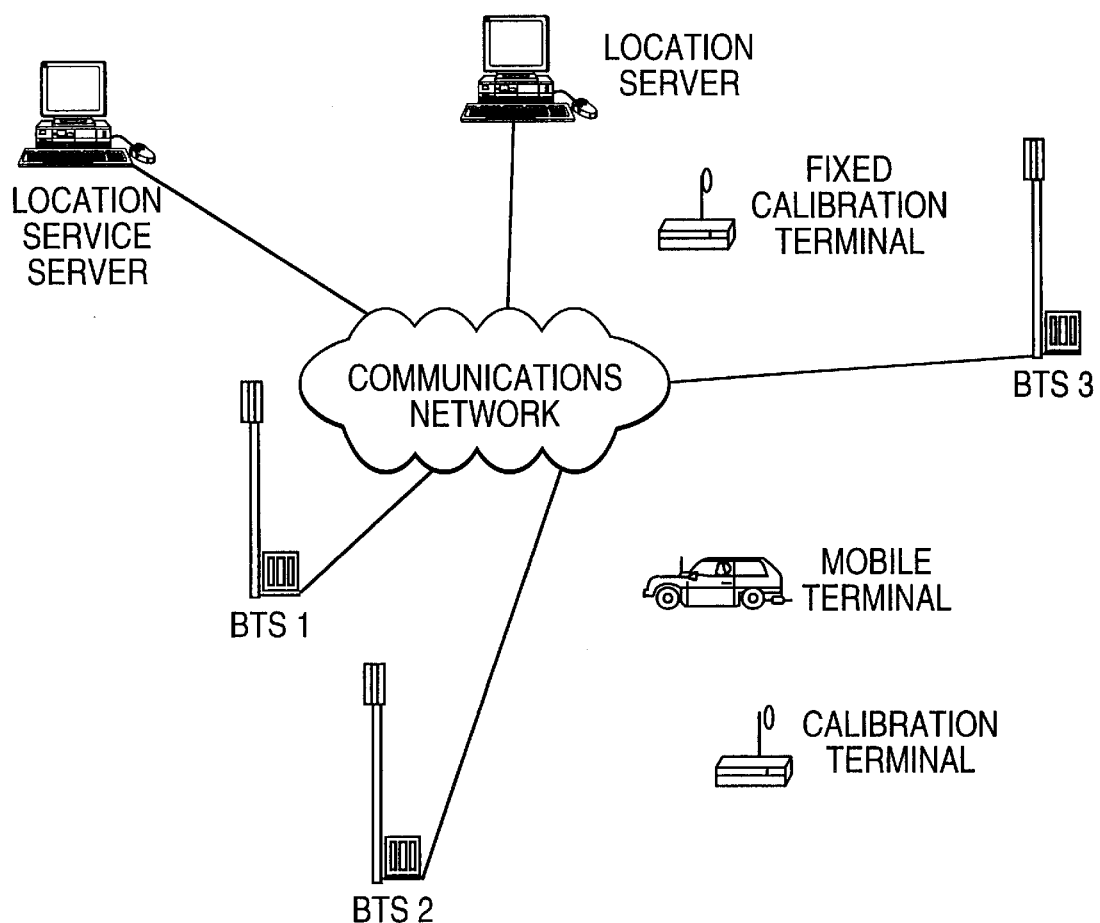
FIG. 1 illustrates a mobile communication network in accordance with the invention.

Reference is made first to FIG. 1, which illustrates the physical devices of a communication network in accordance with the invention. As seen in FIG. 1, the communication network includes base stations BTS 1–3 that provide radio signaling for mobile terminals within a region. The base stations are joined by a communications network that provides traffic and signaling communications among the BTSs and other network elements and communication networks. A mobile within the coverage region is generally served for traffic and signaling by the nearest BTS as in conventional mobile communication networks. The mobile typically can also detect signals at lower strength from other nearby base stations.

The communication network of FIG. 1 further includes a location server. The location server may be a computer workstation comprising communication, data processing and data storage subsystems, and associated control programming. The location server provides services associated with determination of the location of a mobile based on TDOA measurements made by the mobile.

The communication network illustrated in FIG. 1 further comprises a location service server for providing additional services to the mobile that are dependent upon a determination of the location of the mobile and instructions received from the mobile. Like the location server, the location service server may be a computer workstation comprising communication, data processing and data storage subsystems, and associated control programming. While the communication network illustrated in FIG. 1 comprises a location server and location services server which are deployed on separate work stations, it will be appreciated that these servers may be logical devices that are implemented on a single physical device or across multiple physical devices, in accordance with the specifications of the particular implementation.

The communication network of FIG. 1 further includes calibration terminals for making TDOA measurements for base station pairs at known location within the area covered by the network. Correction factors for base station pairs may be derived from TDOA measurements made at calibration terminals and applied to TDOA measurements made by mobiles to improve the accuracy of location determinations. Devices and processes related to the use of calibration terminals for increasing the accuracy of location determination is disclosed in the commonly invented and commonly owned copending application Ser. No. (not yet assigned), entitled "DEVICES AND PROCESSES IN A MOBILE RADIO COMMUNICATION NETWORK HAVING CALIBRATION TERMINALS", the entirety of which is incorporated herein by reference for its teaching regarding devices and processes related to the use of calibration terminals to increase the accuracy of location determination Basic system processes in accordance with the invention are now described. The manner in which the various component functions of these processes are distributed among network elements will vary in accordance with network specifications. Various embodiments of network elements in accordance with various network specifications are discussed below.

Figure 2:
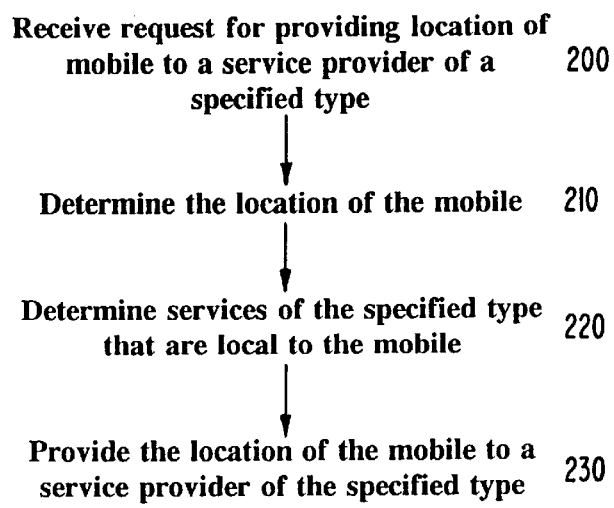
FIG. 2 illustrates a first system process in accordance with the invention.

A first system process in accordance with the invention is illustrated in FIG. 2. The first system process involves providing the location of a mobile to a service provider of a specified type, for example, an emergency medical service provider.

As seen in FIG. 2, the system first receives 200 a request for providing the location of the mobile to a service provider of a specified type. The request may be provided, for example, in the form of the initiation of a call to the service provider. The system then determines 210 the location of mobile. Determination of the location of the mobile may be accomplished using TDOA measurements made by the mobile. The TDOA measurements are corrected by the application of correction factors derived from calibration TDOA measurements made at calibration terminals.

Once the location of the mobile is determined, the system determines 220 a service provider of the specified type that is local to the mobile. This may generally be accomplished through reference to a database associating service providers with service provider types or descriptions, and with geographic locations. The system then provides 230 the location of the mobile to the service provider.

Figure 3:
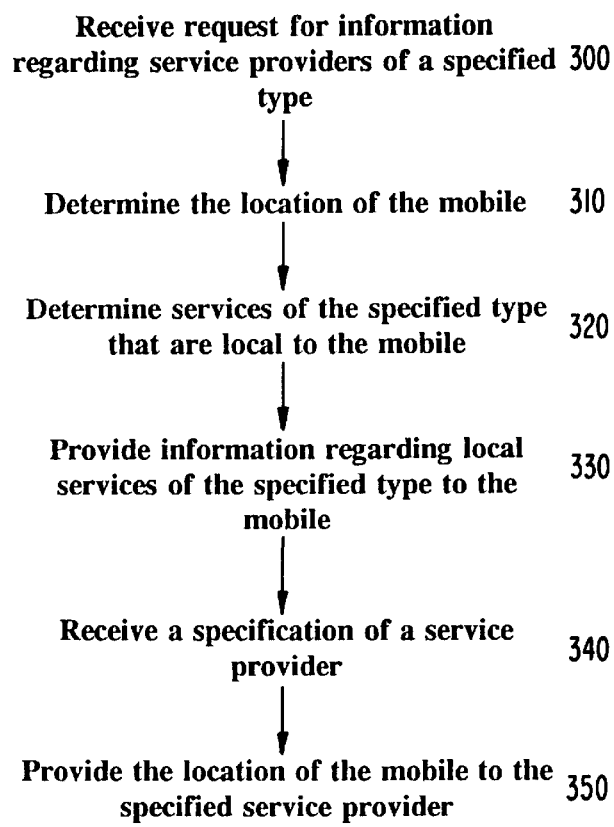
FIG. 3 illustrates a second system process in accordance with the invention.

A second system process in accordance with the invention is illustrated in FIG. 3. The second system process involves providing a mobile with information regarding service providers that are local to the mobile. The process may further include providing the location of the mobile to a local service provider specified by the mobile.

As seen in FIG. 3, the system first receives 300 a request for information regarding service providers of a specified type that are local to the mobile. The system then determines 310 the location of the mobile. Determination of the location of the mobile may be accomplished using TDOA measurements made by the mobile. The TDOA measurements are corrected through the application of correction factors derived from calibration TDOA measurements made at calibration terminals.

Once the location of the mobile is determined, the system determines 320 services of the specified type that are local to the mobile. This may generally be accomplished through reference to a database associating service providers with service provider types or descriptions, and with geographic locations. The system then provides 330 information regarding local services of the specified type to the mobile.

The process may further include receiving 340 a specification of a service provider from the mobile. The system then provides 350 the location of the mobile to the specified service provider. Providing the location of the mobile may be done in conjunction with the initiation of a call to the specified service provider.

Various embodiments and associated functionalities of network elements in accordance with various network specifications are now described. Each described network element, including mobiles, base stations, location servers, location service servers, and calibration terminals, comprises communication, data processing and data storage subsystems acting in accordance with appropriate control programming. The communication, data processing and data storage subsystems and associated control programming therefore comprise the means for providing the various functionalities described with respect to each embodiment.

Figure 4:
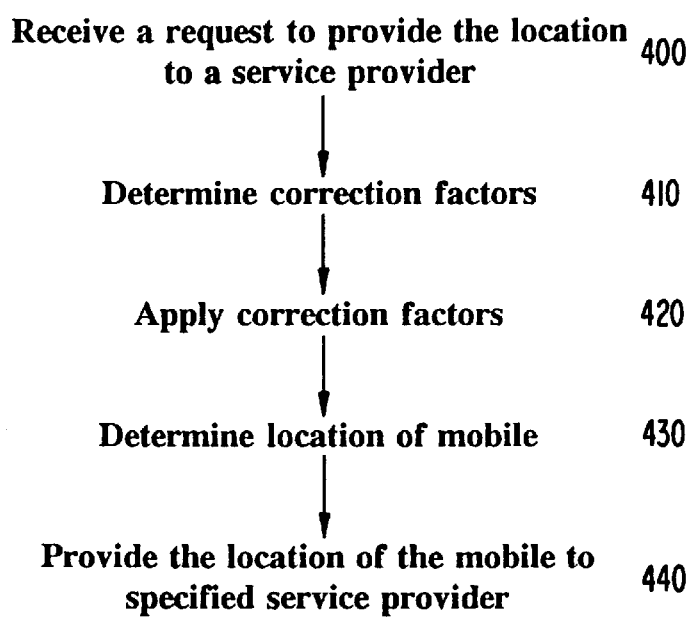
FIG. 4 illustrates a process in a communication network in accordance with a first embodiment of the invention.

In a first embodiment of the invention, the location of a mobile is provided to a service provider specified by the mobile. A process performed in the network in accordance with the first embodiment is illustrated in FIG. 4. As seen in FIG. 4, a request for providing a location to a service provider is received 400. The request is typically provided by a mobile, received by a base station of the network over the radio signalling channels of the network, and provided to the appropriate network subsystem for further processing. The request includes TDOA measurements for at least three base station pairs and a specification of a service provider. The service provider may be specified, for example, by a telephone number (e.g. 911) or other predetermined code associated with the service provider.

Upon receiving the request, correction factors associated with the TDOA measurements received in the request are determined 410. Correction factors may consist of a single correction factor associated with each base station pair, or a set of correction factors may be associated with a base station pair and the correction factor selected the set according to the geographic location of the mobile. The approximate location of the mobile, determined using uncorrected TDOA measurements, may be used to select an appropriate correction factor from the correction factor data base. Correction factors may be simply determined by a network element such as a location server by, for example, reference to a database associating correction factors with base station pairs, or by receiving a periodic correction factor message from a base station, or by providing a query to a calibration terminal to supply correction factors. Alternatively, correction factors may be determined by determining a difference between TDOA measurements for each base station pair made at a calibration terminal, and an expected TDOA for each base station pair at the calibration terminal. Tie data required for this determination may likewise be maintained in a database or may be obtained through a queries to calibration terminals, depending upon the particular network implementation.

The determined correction factors are then applied 420 to the corresponding TDOA measurements, and the location of the mobile is determined 430 using the corrected TDOA measurements. The location of the mobile is then provided 440 to the specified service provider.

Figure 5:
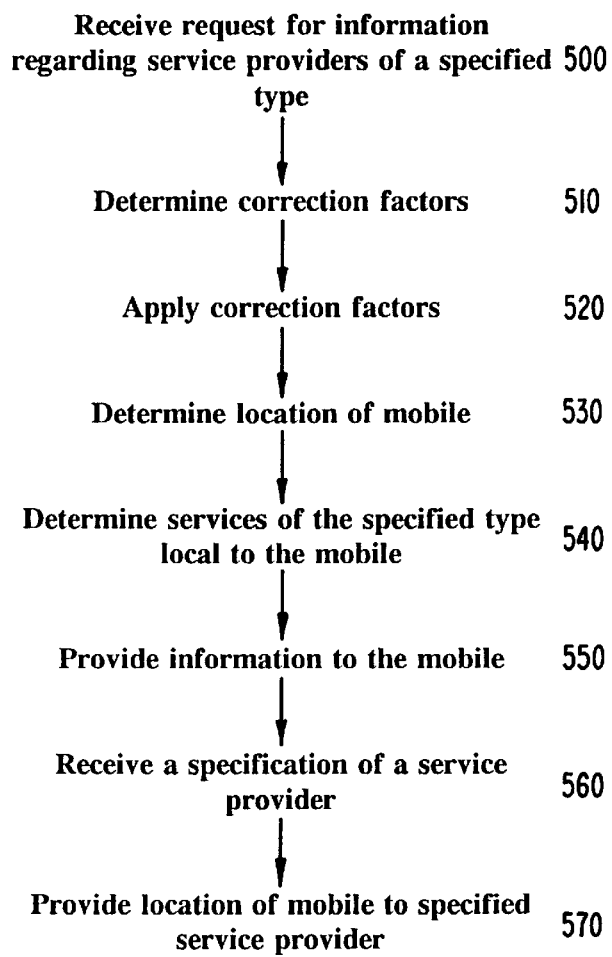
FIGS. 5 and 5A illustrate a process in a communication network and mobile, respectively, in accordance with a second embodiment of the invention.
Figure 5A:
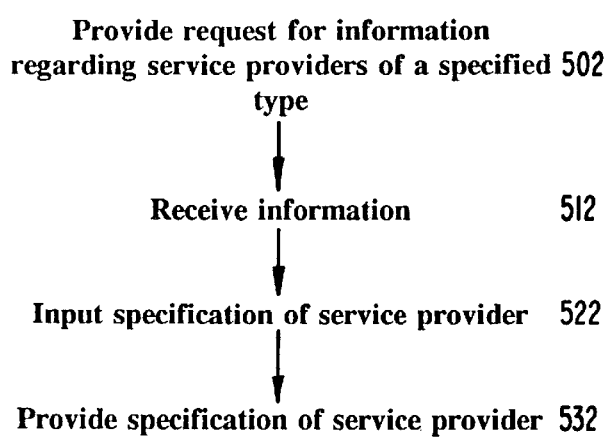

A second embodiment of the invention involves providing information to a mobile regarding service providers of a specified type that are local to the mobile. A process performed in accordance with the second embodiment in the network is illustrated in FIG. 5. As seen in FIG. 5, a request for providing information regarding service providers of a specified type is received 500. The request is typically provided by a mobile, received by a base station of the network over the radio signalling channels of the network, and provided to the appropriate network subsystem for further processing. A complementary process executed in a mobile is illustrated in FIG. 5A. A request is provided 502 by a mobile that includes TDOA measurements for at least three base station pairs and a specification of a service provider. The service provider type may be specified, for example, by a predetermined code associated with the service provider type.

Upon receiving the request, correction factors associated with the TDOA measurements received in the request are determined 510. Correction factors may be simply determined by a network element such as a location server by, for example, reference to a database associating correction factors with base station pairs, or by receiving periodic correction factor messages from base stations, or by providing a query to a calibration terminal to supply correction factors. Alternatively, correction factors may be determined by determining a difference between TDOA measurements for each base station pair made at a calibration terminal, and an expected TDOA for each base station pair at the calibration terminal. The data required for this determination may likewise be maintained in a database or may be obtained through queries to calibration terminals, depending upon the particular network implementation.

The determined correction factors are then applied 520 to the corresponding TDOA measurements, and the location of the mobile is determined 530 using the corrected TDOA measurements. The network then determines 540 services of the requested type that are local to the determined location of the mobile. This may be accomplished in a location service server, for example, through reference to a database associating service providers with service provider types and geographic locations within the coverage area of the network.

When services of the specified type that are local to the mobile are determined, information regarding the services is provided 550 to the mobile. Various information may be provided, such as the identification and location of service providers, directions to the locations of the service providers, and other pertinent information.

The mobile receives 512 the information regarding local services and inputs 522 a specification of a service provider. The specification of the service provider is provided 532 to the network.

The process in the network may further comprise receiving 560 a specification of a service provider, and providing 570 the location of the mobile to the specified service provider.

Figure 6:
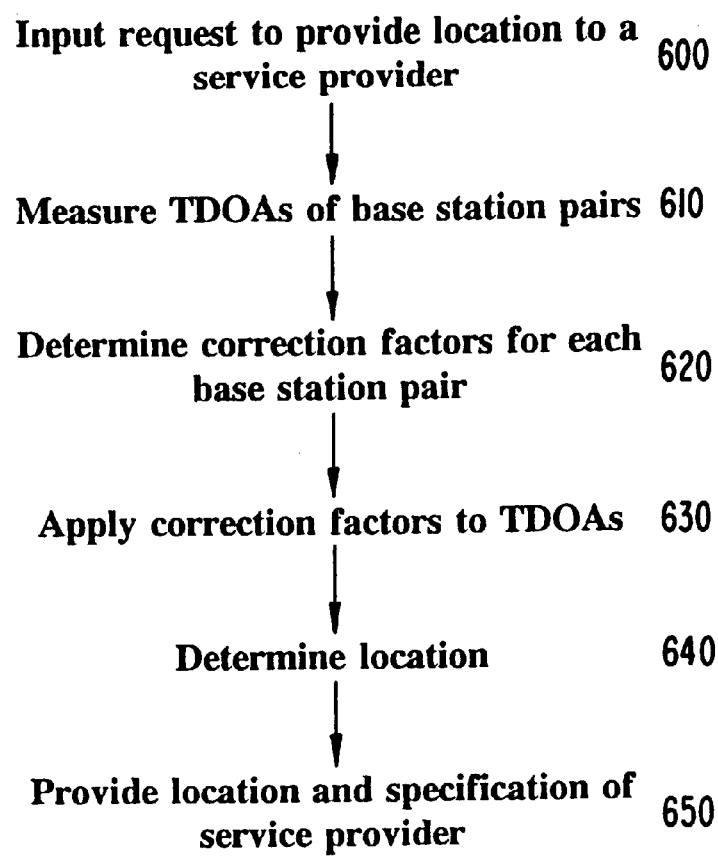
FIGS. 6 and 6A illustrate processes in a mobile and a remainder of a communication network, respectively, in accordance with a third embodiment of the invention.

A third embodiment of the invention involves providing the location of a mobile to a services provider, where the location of the mobile has been determined at the mobile and corrected using TDOA correction factors. A process performed in a mobile in accordance with the third embodiment is illustrated in FIG. 6. As seen in FIG. 6, a request for service from a service provider is received 600 at the mobile in the form of input from a user of the mobile. Determination of the location of the mobile then takes place in the mobile. Determination of the location comprises measuring 610 the TDOAs of signal from at least three base station pairs. Upon making TDOA measurements from at least three base station pairs, the mobile determines 620 correction factors associated with each base station pair. Depending upon the particular implementation of the network, correction factors may be determined by receiving periodic broadcasts of correction factors from appropriate calibration terminals or base stations, querying appropriate calibration terminals, querying another appropriate network element such as a location server that maintains a database associating correction factors with base station pairs, or referencing a database of correction factors maintained at the mobile. Alternatively, correction factors may be determined by determining a difference between TDOA measurements for each base station pair made at a calibration terminal, and an expected TDOA for each base station pair at the calibration terminal. The data required for this determination may likewise be obtained from calibration terminals or base stations, other network elements maintaining appropriate databases, or a database maintained at the mobile, depending upon the particular network implementation.

Upon determining correction factors associated with each base station pair, the correction factors are applied 630 to corresponding TDOA measurements to yield corrected TDOA measurements. The location of the mobile is then determined 640 in accordance with the corrected TDOA measurements. The location of the mobile and a specification of a service provider are then provided 650 to the network. This may be done in conjunction with providing a request for initiation of a call to the service provider.

Figure 6A:
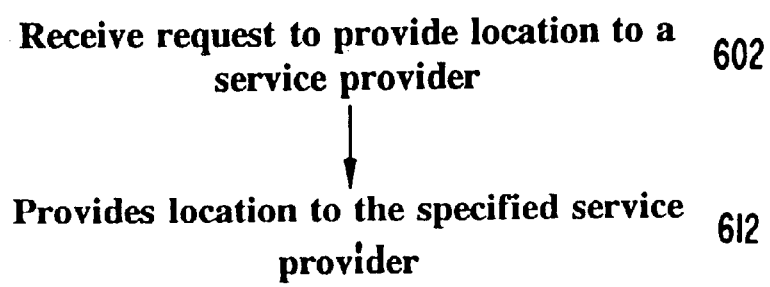

A complementary process in the remainder of the network in accordance with the third embodiment is illustrated in FIG. 6*a*. As shown in FIG. 6*a*, the network receives 602 a request from a mobile for providing the location of the mobile to a specified service provider. The request includes the location of the mobile and a specification of a service provider. The network then provides 612 the location of the mobile to the specified service provider.

Figure 7:
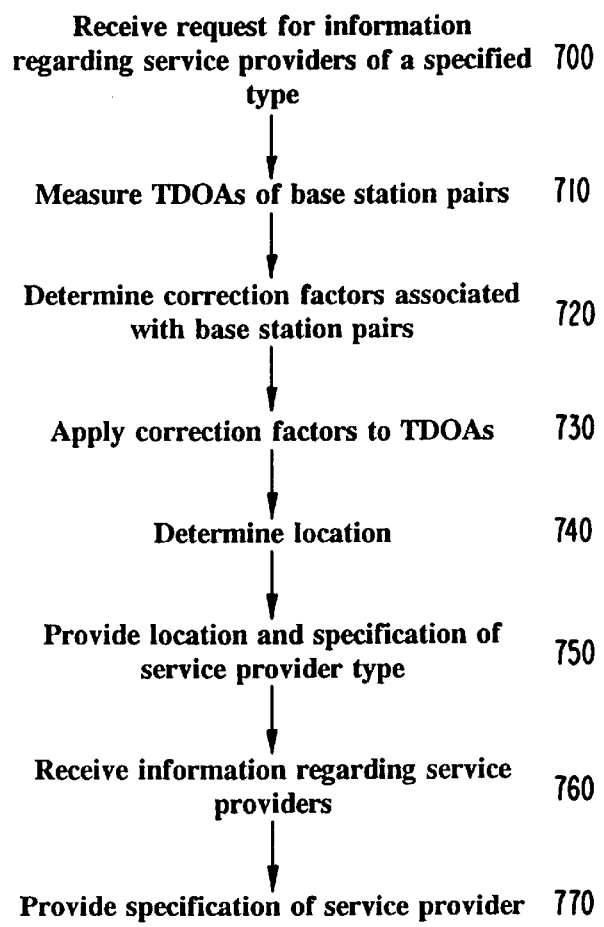
FIGS. 7 and 7A illustrate a processes in a mobile and communication network, respectively, in accordance with a fourth embodiment of the invention.

A fourth embodiment of the invention involves providing to the mobile information regarding services of a specified type that are local to the mobile, where the location of the mobile has been determined in the mobile and corrected using correction factors. A process performed in a mobile in accordance with the fourth embodiment is illustrated in FIG. 7. As seen in FIG. 7, a request for information regarding service providers of a specified type is received 700 at the mobile as input provided by a user of the mobile. The request includes a specification of a service provider type. TDOAs of signals from at least three base station pairs are then measured 710. The mobile then determines 720 correction factors associated with each base station pair. Depending upon the particular implementation of the network, correction factors may be determined by receiving periodic reports of correction factors from appropriate calibration terminals or base stations, querying appropriate calibration terminals, querying another appropriate network element such as a location servers that maintains a database associating correction factors with base station pairs, or referencing a database of correction factors maintained at the mobile. Alternatively, correction factors may be determined by determining a difference between TDOA measurements for each base station pair made at a calibration terminal, and an expected TDOA for each base station pair at the calibration terminal. The data required for this determination may likewise be obtained from calibration terminals or base stations, network elements maintaining appropriate databases, or a database maintained at the mobile, depending upon the particular network implementation.

Figure 7A:
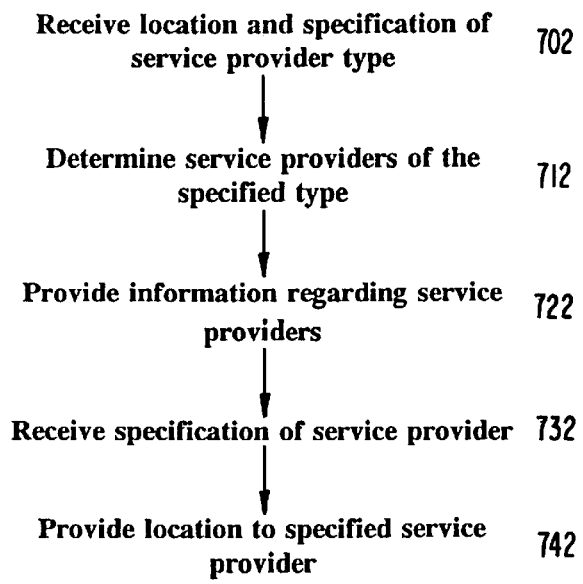

Upon determining correction factors for each base station pair, the correction factors are applied 730 to the corresponding TDOA measurements to yield corrected TDOA measurements. The location of the mobile is then determined 740 in accordance with the corrected TDOA measurements. The location of the mobile and a specification of a service provider type are then provided 750 to an appropriate element of the network such as a location service server. The mobile subsequently receives 760 information regarding service providers of the specified type, and provides 770 a specification of a particular service provider of the specified type to the network. This may be done in conjunction with providing a request for initiation of a call to the service provider. A complementary process in the remainder of the network in accordance with the fourth embodiment proceeds substantially as illustrated in FIG. 7A.

It is noted that in the discussion provided above, the second and fourth embodiments involve devices and processes wherein a request for information regarding service providers of a specified type is provided by a mobile, information is provided by the network, and a specification of a service provider is then provided by the mobile. However, it will be appreciated that multiple specification steps may be employed to achieve the purpose of these embodiments. For example, if a mobile user requests information regarding local food service providers, the network may provide information in the form of a list of sub-types, for example, a list of ethnic varieties of restaurant in the local area. A further specification step could thus be employed to specify a single sub-type, for which information is then provided.

While the description provided above is intended to disclose the invention and its presently preferred embodiments, those having ordinary skill in the art will recognize further alternative embodiments which may be derived from the above disclosure. Accordingly, the scope of the invention is not limited by the above disclosure, but is intended to encompass the subject matter defined by the appended claims and equivalents thereof.

What is claimed is:

1. A process in a mobile communication network comprising:
   determining time difference of arrival (TDOA) measurements made by a mobile for at least three base station pairs of the network;
   determining correction factors corresponding to each of said base station pairs;
   applying correction factors to corresponding TDOA measurements to yield corrected TDOA measurements;
   determining the location of the mobile from said corrected TDOA measurements;
   receiving a specification of a type of service provider from the mobile;
   determining service providers of the type specified by the mobile that are local to the determined location of the mobile; and
   providing information regarding the service providers to the mobile.

2. The process claimed in claim 1, further comprising:
   receiving a specification of a service provider from the mobile; and
   providing the location of the mobile to the specified service provider.

3. The process claimed in claim 2, wherein providing the location of the mobile comprises initiating a call to the specified service provider.

4. The process claimed in claim 1, wherein determining correction factors comprises querying a database associating correction factors with base station pairs.

5. The process claimed in claim 1, wherein determining correction factors comprises:
   determining calibration TDOA measurements for said base station pairs made at known locations; and
   determining differences between said calibration TDOA measurements and expected TDOA measurements at said known locations for said base station pairs.

6. A mobile communication network, comprising:
   means for determining time difference of arrival (TDOA) measurements made by a mobile for at least three base station pairs of the network;
   means for determining correction factors corresponding to each of said base station pairs;
   means for applying correction factors to corresponding TDOA measurements to yield corrected TDOA measurements;
   means for determining the location of the mobile from said corrected TDOA measurements;
   means for receiving a specification of a type of service provider from the mobile;
   means for determining service providers of the type specified by the mobile that are local to the determined location of the mobile; and
   means for providing information regarding the service providers to the mobile.

7. The mobile communication network claimed in claim 6, further comprising:
   means for receiving a specification of a service provider from the mobile; and
   means for providing the location of the mobile to the specified service provider.

8. The mobile communication network claimed in claim 6, wherein said means for providing the location of the mobile comprises means for initiating a call to the specified service provider.

9. The mobile communication network claimed in claim 6, wherein said means for determining correction factors comprises a database associating correction factors with base station pairs.

10. The mobile communication network claimed in claim 6, wherein said means for determining correction factors comprises:
    means for determining calibration TDOA measurements for said base station pairs made at known locations; and
    means for determining differences between said calibration TDOA measurements and expected TDOA measurements at said known locations for said base station pairs.

11. A process in a mobile of a mobile radio communication network, comprising:
    measuring a time difference of arrival (TDOA) at the mobile for at least three base station pairs of the network;
    determining correction factors associated with each of said base station pairs;
    applying said correction factors to corresponding TDOA measurements to yield corrected TDOA measurements;
    determining a location from said TDOA measurements;
    providing said location and a specification of a service provider type; and
    receiving information regarding service providers of the specified type that are local to the location of the mobile.

12. The process claimed in claim 11, further comprising providing a specification of a service provider identified in the received information.

13. The process claimed in claim 12, wherein providing a specification of a service provider comprises initiating a call to said service provider.

14. The process claimed in claim 11, wherein determining correction factors comprises receiving correction factors broadcast from base stations.

15. The process claimed in claim 11, wherein determining correction factors comprises querying at least one calibration terminal maintaining a database associating correction factors with base station pairs.

16. The process claimed in claim 11, wherein determining said correction factors comprises:
    determining calibration TDOA measurements for said base station pairs made at known locations; and
    determining differences between said calibration TDOA measurements and expected TDOA measurements at said known locations for said base station pairs.

17. The process claimed in claim 16, wherein determining calibration TDOA measurements comprises querying a location server maintaining a database associating calibration TDOA measurements with case station pairs.

18. The process claimed in claim 16, wherein determining calibration TDOA measurements comprises querying at least one calibration terminal maintaining a database associating calibration TDOA measurements with base station pairs.

19. A mobile of a mobile radio communication network, comprising:
   means for measuring a time difference of arrival (TDOA) at the mobile for at least three base station pairs of the network;
   means for determining correction factors associated with each of said base station pairs;
   means for applying said correction factors to corresponding TDOA measurements to yield corrected TDOA measurements; determining a location from said TDOA measurements;
   means for providing said location and a specification of a service provider type; and
   means for receiving information regarding service providers of the specified type that are local to the location of the mobile.

20. The mobile claimed in claim 19, further comprising means for providing a specification of a service provider identified in received information regarding service providers.

21. The mobile claimed in claim 20, wherein said means for providing a specification of a service provider comprises means for initiating a call to said service provider.

22. The mobile claimed in claim 19, wherein said means for determining correction factors comprises means for receiving correction factors broadcasts from base stations.

23. The mobile claimed in claim 19, wherein said means for determining correction factors comprises means for querying at least one calibration terminal maintaining a database associating correction factors with base station pairs.

24. The mobile claimed in claim 19, wherein said means for determining correction factors comprises:
   means for determining calibration TDOA measurements for said base station pairs made at known locations; and
   means for determining differences between said calibration TDOA measurements and expected TDOA measurements at said known locations for said base station pairs.

25. The mobile claimed in claim 24, wherein said means for determining calibration TDOA measurements comprises means for querying a location server maintaining a database associating calibration TDOA measurements with base station pairs.

26. The mobile claimed in claim 24, wherein said means for determining calibration TDOA measurements comprises means for querying at least one calibration terminal maintaining a database associating calibration TDOA measurements with base station pairs.

27. A process in a mobile of a mobile radio communication network, comprising:
   measuring a time difference of arrival (TDOA) at the mobile for at least three base station pairs of the network;
   determining correction factors associated with each of said base station pairs by querying at least one calibration terminal maintaining a database associating correction factors with base station pairs;
   applying said correction factors to corresponding TDOA measurements to yield corrected TDOA measurements;
   determining a location of the mobile from said TDOA measurements; and
   issuing a request to provide the location of the mobile to a specified service provider.

28. The process claimed in claim 27, wherein providing a request to provide the location of the mobile to a specified service provider comprises initiating a call to the service provider.

29. A mobile of a mobile radio communication network, comprising:
   means for measuring a time difference of arrival (TDOA) at the mobile for at least three base station pairs of the network;
   means for determining correction factors associated with each of said base station pairs;
   means for applying said correction factors to corresponding TDOA measurements to yield corrected TDOA measurements by querying at least one calibration terminal maintaining a database associating correction factors with base station pairs;
   means for determining a location from said TDOA measurements; and
   means for issuing a request to provide the location of the mobile to a specified service provider.

30. The mobile claimed in claim 29, wherein said means for providing a request to provide the location of the mobile to a specified service provider comprises means for initiating a call to the service provider.

31. A process in an element of a mobile communication network, comprising:
   determining time difference of arrival (TDOA) measurements at the location of a mobile of the network for at least three base station pairs of the network;
   determining correction factors corresponding to each of said base station pairs by querying at least one calibration terminal maintaining a database associating correction factors with base station pairs;
   applying correction factors to corresponding TDOA measurements to yield corrected TDOA measurements;
   determining a location of the mobile from said corrected TDOA measurements; and
   providing the determined location to a service provider specified by the mobile.

32. The process claimed in claim 31, wherein determining TDOA measurements comprises receiving TDOA measurements made by a mobile.

33. The process claimed in claim 31, wherein providing the location of the mobile comprises initiating a call to the specified service provider.

34. An element of a mobile communication network, comprising:
   means for determining time difference of arrival (TDOA) measurements at the location of a mobile of the network for at least three base station pairs of the network;
   means for determining correction factors corresponding to each of said base station pairs by querying at least one calibration terminal maintaining a database associating correction factors with base station pairs;
   means for applying correction factors to corresponding TDOA measurements to yield corrected TDOA measurements;
   means for determining a location of the mobile from said corrected TDOA measurements; and means for providing the determined location to a service provider specified by the mobile.

35. The element claimed in claim 34, wherein said means for determining TDOA measurements comprises means for receiving TDOA measurements made by a mobile.

36. The element claimed in claim 34, wherein said means for providing the location of the mobile comprises means for initiating a call to the specified service provider.

37. A process in an element of a mobile communication network comprising:
    determining a time difference of arrival (TDOA) measurement for at least three base station pairs of the network;
    determining correction factors corresponding to each of said base station pairs;
    applying correction factors to corresponding TDOA measurements to yield corrected TDOA measurements;
    determining the location of the mobile from said corrected TDOA measurements;
    receiving a specification of a type of service provider from the mobile;
    determining service providers of the type specified by the mobile that are local to the determined location of the mobile; and
    providing information regarding the service providers to the mobile.

38. The process claimed in claim 37, further comprising:
    receiving a specification of a service provider provided by the mobile; and
    providing the location of the mobile to the specified service provider.

39. The process claimed in claim 38, wherein providing the location of the mobile comprises initiating a call to the specified service provider.

40. The process claimed in claim 37, wherein determining correction factors comprises receiving correction factor messages from base stations.

41. The process claimed in claim 37, wherein determining correction factors comprises querying at least one calibration terminal maintaining a database associating correction factors with base station pairs.

42. The process claimed in claim 37, wherein determining correction factors comprises:
    determining calibration TDOA measurements for said base station pairs made at known locations; and
    determining differences between said calibration TDOA measurements and expected TDOA measurements at said known locations for said base station pairs.

43. The process claimed in claim 42, wherein determining calibration TDOA measurements comprises querying a database associating calibration TDOA measurements with base station pairs.

44. The process claimed in claim 42, wherein determining calibration TDOA measurements comprises querying at least one calibration terminal maintaining a database associating calibration TDOA measurements with base station pairs.

45. An element of a mobile communication network comprising:
    means for determining a time difference of arrival (TDOA) for at least three base station pairs of the network;
    means for determining correction factors corresponding to each of the base station pairs;
    means for applying correction factors to corresponding TDOA measurements to yield corrected TDOA measurements;
    means for determining the location of the mobile from said corrected TDOA measurements;
    means for receiving a specification of a type of service provider from the mobile;
    means for determining service providers of the type specified by the mobile that arc local to the determined location of the mobile; and
    means for providing information regarding the service providers to the mobile.

46. The element claimed in claim 45, further comprising:
    means for receiving a specification of a service provider provided by the mobile; and
    means for providing the location of the mobile to the specified service provider.

47. The element claimed in claim 45, wherein said means for providing the location of the mobile comprises means for initiating a call to the specified service provider.

48. The element claimed in claim 45, wherein said means for determining correction factors comprises means for receiving correction factor messages from base stations.

49. The element claimed in claim 45, wherein said means for determining correction factors comprises means for querying at least one calibration terminal maintaining a database associating correction factors with base station pairs.

50. The element claimed in claim 45, wherein said means for determining correction factors comprises:
    means for determining calibration TDOA measurements for said base station pairs made at known locations; and
    means for determining differences between said calibration TDOA measurements and expected TDOA measurements at said known locations for said base station pairs.

51. The element claimed in claim 50, wherein said means for determining calibration TDOA measurements comprises a database associating calibration TDOA measurements with base station pairs.

52. A process in an element of a mobile communication network, comprising:
    determining time difference of arrival (TDOA) measurements at the location of a mobile of the network for at least three base station pairs of the network;
    determining calibration TDOA measurements for each of said base station pairs made at known locations by querying a database associating calibration TDOA measurements with base station pairs;
    determining correction factors comprising differences between said calibration TDOA measurements and expected TDOA measurements at said known locations for said base station pairs;
    applying correction factors to corresponding TDOA measurements to yield corrected TDOA measurements;
    determining a location of the mobile from said corrected TDOA measurements; and
    providing the determined location to a service provider specified by the mobile.

53. The process claimed in claim 52, wherein determining TDOA measurements comprises receiving TDOA measurements made by a mobile.

54. The process claimed in claim 52, wherein providing the location of the mobile comprises initiating a call to the specified service provider.

55. A process in an element of a mobile communication network, comprising:
    determining time difference of arrival (TDOA) measurements at the location of a mobile of the network for at least three base station pairs of the network;

determining calibration TDOA measurements for each of said base stat on pairs made at known locations by querying a calibration terminal associating calibration TDOA measurements with base station pairs;

determining correction factors comprising differences between said calibration TDOA measurements and expected TDOA measurements at said known locations for said base station pairs;

applying correction factors to corresponding TDOA measurements to yield corrected TDOA measurements;

determining a location of the mobile from said corrected TDOA measurements; and providing the determined location to a service provider specified by the mobile.

56. The process claimed in claim 55, wherein determining TDOA measurements comprises receiving TDOA measurements made by a mobile.

57. The process claimed in claim 55, wherein providing the location of the mobile comprises initiating a call to the specified service provider.

58. An element of a mobile communication network, comprising:

means for determining time difference of arrival (TDOA) measurements at the location of a mobile of the network for at least three base station pairs of the network;

means for determining calibration TDOA measurements for each of said base station pairs made at known locations by querying a database associating calibration TDOA measurements with base station pairs;

means for determining correction factors comprising differences between said calibration TDOA measurements and expected TDOA measurements at said known locations for said base station pairs;

means for applying correction factors to corresponding TDOA measurements to yield corrected TDOA measurements;

means for determining a location of the mobile from said corrected TDOA measurements; and means for providing the determined location to a service provider specified by the mobile.

59. The element claimed in claim 58, wherein said means for determining TDOA measurements comprises means for receiving TDOA measurements made by a mobile.

60. The element claimed in claim 58, wherein said means for providing the location of the mobile comprises means for initiating a call to the specified service provider.

61. An element of a mobile communication network, comprising:

means for determining time difference of arrival (TDOA) measurements at the location of a mobile of the network for at least three base station pairs of the network;

means for determining calibration TDOA measurements for each of said base station pairs made at known locations by querying a calibration terminal associating calibration TDOA measurements with base station pairs;

means for determining correction factors comprising differences between said calibration TDOA measurements and expected TDOA measurements at said known locations for said base station pairs;

means for applying correction factors to corresponding TDOA measurements to yield corrected TDOA measurements;

means for determining a location of the mobile from said corrected TDOA measurements; and means for providing the determined location to a service provider specified by the mobile.

62. The element claimed in claim 61, wherein said means for determining TDOA measurements comprises means for receiving TDOA measurements made by a mobile.

63. The element claimed in claim 61, wherein said means for providing the location of the mobile comprises means for initiating a call to the specified service provider.

64. A process in a mobile communication network, comprising:

determining time difference of arrival (TDOA) measurements at the location of a mobile of the network for at least three base station pairs of the network;

determining correction factors corresponding to each of said base station pairs by querying at least one calibration terminal maintaining a database associating correction factors with base station pairs;

applying correction factors to corresponding TDOA measurements to yield corrected TDOA measurements;

determining a location of the mobile from said corrected TDOA measurements; and providing the determined location to a service provider specified by the mobile.

65. The process claimed in claim 64, wherein providing the location of the mobile comprises initiating a call to the specified service provider.

66. A mobile communication network, comprising:

means for determining time difference of arrival (TDOA) measurements at the location of a mobile of the network for at least three base station pairs of the network;

means for determining correction factors corresponding to each of said base station pairs by querying at least one calibration terminal maintaining a database associating correction factors with base station pairs;

means for applying correction factors to corresponding TDOA measurements to yield corrected TDOA measurements;

means for determining a location of the mobile from said corrected TDOA measurements; and means for providing the determined location to a service provider specified by the mobile.

67. The network claimed in claim 66, wherein said means for providing the location of the mobile comprises means for initiating a call to the specified service provider.

68. A process in a mobile communication network, comprising:

determining time difference of arrival (TDOA) measurements at the location of a mobile of the network for at least three base station pairs of the network;

determining calibration TDOA measurements for each of said base station pairs made at known locations by querying a database associating calibration TDOA measurements with base station pairs;

determining correction factors comprising differences between said calibration TDOA measurements and expected TDOA measurements at said known locations for said base station pairs;

applying correction factors to corresponding TDOA measurements to yield corrected TDOA measurements;

determining a location of the mobile from said corrected TDOA measurements; and providing the determined location to a service provider specified by the mobile.

69. The process claimed in claim 68, wherein providing the location of the mobile comprises initiating a call to the specified service provider.

70. A process in a mobile communication network, comprising:
- determining time difference of arrival (TDOA) measurements at the location of a mobile of the network for at least three base station pairs of the network;
- determining calibration TDOA measurements for each of said base station pairs made at known locations by querying a calibration terminal associating calibration TDOA measurements with base station pairs;
- determining correction factors comprising differences between said calibration TDOA measurements and expected TDOA measurements at said known locations for said base station pairs;
- applying correction factors to corresponding TDOA measurements to yield corrected TDOA measurements;
- determining a location of the mobile from said corrected TDOA measurements; and
- providing the determined location to a service provider specified by the mobile.

71. The process claimed in claim 70, wherein providing the location of the mobile comprises initiating a call to the specified service provider.

72. A mobile communication network, comprising:
- means for determining time difference of arrival (TDOA) measurements at the location of a mobile of the network for at least three base station pairs of the network;
- means for determining calibration TDOA measurements for each of said base station pairs made at known locations by querying a database associating calibration TDOA measurements with base station pairs;
- means for determining correction factors comprising differences between said calibration TDOA measurements and expected TDOA measurements at said known locations for said base station pairs;
- means for applying correction factors to corresponding TDOA measurements to yield corrected TDOA measurements;
- means for determining a location of the mobile from said corrected TDOA measurements; and
- means for providing the determined location to a service provider specified by the mobile.

73. The network claimed in claim 72, wherein said means for providing the location of the mobile comprises means for initiating a call to the specified service provider.

74. A mobile communication network, comprising:
- means for determining time difference of arrival (TDOA) measurements at the location of a mobile of the network for at least three base station pairs of the network;
- means for determining calibration TDOA measurements for each of said base station pairs made at known locations by querying a calibration terminal associating calibration TDOA measurements with base station pairs;
- means for determining correction factors comprising differences between said calibration TDOA measurements and expected TDOA measurements at said known locations for said base station pairs;
- means for applying correction factors to corresponding TDOA measurements to yield corrected TDOA measurements;
- means for determining a location of the mobile from said corrected TDOA measurements; and
- means for providing the determined location to a service provider specified by the mobile.

75. The network claimed in claim 74, wherein said means for providing the location of the mobile comprises means for initiating a call to the specified service provider.

76. A process in a mobile of a mobile radio communication network, comprising:
- measuring a time difference of arrival (TDOA) at the mobile for at least three base station pairs of the network;
- determining calibration TDOA measurements for said base station pairs made at known locations by querying a location server maintaining a database associating calibration TDOA measurements with base station pairs; and
- determining correction factors comprising differences between said calibration TDOA measurements and expected TDOA measurements at said known locations for said base station pairs;
- applying said correction factors to corresponding TDOA measurements to yield corrected TDOA measurements;
- determining a location from said TDOA measurements; and
- providing a request to provide the location of the mobile to a specified service provider.

77. The process claimed in claim 76, wherein determining calibration TDOA measurements comprises querying at least one calibration terminal maintaining a database associating calibration TDOA measurements with base station pairs.

78. A mobile of a mobile radio communication network, comprising:
- means for measuring a time difference of arrival (TDOA) at the mobile for at least three base station pairs of the network;
- means for determining calibration TDOA measurements for said base station pairs made at known locations by querying a location server maintaining a database associating calibration TDOA measurements with base station pairs; and
- means for determining correction factors comprising differences between said calibration TDOA measurements and expected TDOA measurements at said known locations for said base station pairs;
- means for applying said correction factors to corresponding TDOA measurements to yield corrected TDOA measurements;
- means for determining a location from said TDOA measurements; and
- means for providing a request to provide the location of the mobile to a specified service provider.

79. The mobile claimed in claim 78, wherein said means for providing a request to provide the location of the mobile to a specified service provider comprises means for initiating a call to the service provider.

80. A process in a mobile of a mobile radio communication network, comprising:
- measuring a time difference of arrival (TDOA) at the mobile for at least three base station pairs of the network;
- determining calibration TDOA measurements for said base station pair, made at known locations by querying a calibration terminal maintaining a database associating calibration TDOA measurements with base station pairs; and
- determining correction factors comprising differences between said calibration TDOA measurements and expected TDOA measurements at said known locations for said base station pairs;

applying said correction factors to corresponding TDOA measurements to yield corrected TDOA measurements;

determining a location from said TDOA measurements; and providing a request to provide the location of the mobile to a specified service provider.

81. The process claimed in claim 80, wherein determining calibration TDOA measurements comprises querying at least one calibration terminal maintaining a database associating calibration TDOA measurements with base station pairs.

82. A mobile of a mobile radio communication network, comprising:

means for measuring a time difference of arrival (TDOA) at the mobile for at least three base station pairs of the network;

means for determining calibration TDOA measurements for said base station pairs made at known locations by querying a calibration terminal maintaining a database associating calibration TDOA measurements with base station pairs; and means for determining correction factors comprising differences between said calibration TDOA measurements and expected TDOA measurements at said known locations for said base station pairs;

means for applying said correction factors to corresponding TDOA measurements to yield corrected TDOA measurements;

means for determining a location from said TDOA measurements; and means for providing a request to provide the location of the mobile to a specified service provider.

83. The mobile claimed in claim 82, wherein said means for providing a request to provide the location of the mobile to a specified service provider comprises means for initiating a call to the service provider.

\* \* \* \* \*